United States Patent [19]

Wiegand et al.

[11] 3,774,179

[45] Nov. 20, 1973

[54] FERROMAGNETIC STORAGE MEDIUM

[76] Inventor: John R. Wiegand, 882 Balfour St., Valley Stream, N.Y. 11580

[22] Filed: July 22, 1971

[21] Appl. No.: 173,706

[52] U.S. Cl.340/174 ZB, 340/174 MS, 340/174 QA, 340/174 QB, 340/174 TW, 235/61.7 B, 235/61.12 M

[51] Int. Cl. ........................ G11c 11/04, G06k 19/06

[58] Field of Search .............. 340/174 MC, 174 MS, 340/174 QB, 174 ZB, 149 A; 235/61.7 B, 61.12 M

[56] References Cited

UNITED STATES PATENTS

| | | | |
|---|---|---|---|
| 3,299,413 | 1/1967 | Snyder | 340/174 MC |
| 3,626,160 | 12/1971 | Hogopian | 235/61.7 B |
| 3,654,435 | 4/1972 | Vaccaro | 235/61.12 M |
| 3,217,301 | 11/1965 | Shook | 340/174 QB |
| 3,134,096 | 5/1964 | Bartkus et al. | 340/174 ZB |

OTHER PUBLICATIONS

IBM Technical Disclosure Bulletin, Vol. 6, No. 6, 1963, pg. 55–56.

*Primary Examiner*—James W. Moffitt
*Attorney*—Lloyd McAulay

[57] ABSTRACT

A ferromagnetic storage medium consisting of a plurality of ferromagnetic wires each requiring a greater magentic force for nucleating a magnetic domain wall than is required for propagating a magnetic domain wall along the wire. The uniform effect of an external magnetic field upon the wire is modified so that one end of the wire will nucleate a magnetic domain wall before the other end. The modification is achieved by making one end of the wire of lower magnetic reluctance than the rest of the wire, or by spatially offsetting in an axial direction the midpoint of the wire from the midpoint of the magnetic field. The direction of modification of the wire is chosen in accordance with a binary encoding scheme. In the presence of a sufficient magnetic field, a magnetic domain wall will nucleate at the predetermined end of the wire, in accordance with the modification, and the domain wall will propagate to the opposite end. The direction of travel of the magnetic domain wall represents the binary value stored.

7 Claims, 10 Drawing Figures

PATENTED NOV 20 1973 3,774,179

INVENTORS.
JOHN R. WIEGAND
MILTON VELINSKY

BY Leonard H. King
ATTORNEY

FERROMAGNETIC STORAGE MEDIUM

The aforementioned Abstract is neither intended to define the invention of the application which, of course, is measured by the claim, nor is it intended to be limiting as to the scope of the invention in any way.

This invention relates to a magnetic storage medium and more particularly to a method and apparatus for recording binary number of a nucleating ferromagnetic wire.

BACKGROUND OF THE INVENTION

The basic requirement for a material being used in a digital memory is that the material be capable of having two independent and recognizable states. A commonly used memory storage is the magnetic core which can be magnitized in either of two directions depending on the direction of current flow in a wire. If the direction of the current is reversed, the magnetic state is changed. The information stored in the magnetic core is read by means of a sense wire which passes through the core and detects the direction in which the core has previously been magnetized.

In the copending U.S. Pat. application Ser. No. 86,169 filed Nov. 2, 1970 and now abandoned of John Wiegand, and in the continuation in part U.S. application thereof, Ser. No. 137,567 filed Apr. 26, 1971 and now abandoned, there is described a self-nucleating ferromagnetic wire of uniform composition in which the nucleation of a magnetic domain wall is initiated and wherein the domain wall propagates along the length of the wire. The present invention uses the concept of nucleating a magnetic domain wall in a ferromagnetic wire wherein the direction of travel of the magnetic domain wall indicates the binary state of the memory, rather than the direction of magnetism as is presently known in the prior art.

Because the nucleating ferromagnetic wires can be made of very small dimensions, a memory comprising a number of such wires can be compressed into a small space. Such magnetic storage mediums can be placed on credit cards and encoded to read out a particular number. Similarly, identification badges worn by personnel could have such wires embedded within the material and encoded to read the I.D. number. Further applications would include inventory accounting by placing the storage medium on a card and attaching it to a stock item, and also as a non-destructive readout memory for a computer system.

It is accordingly an object of this invention to provide a novel magnetic storage medium.

It is a further object of this invention to provide a magnetic memory using a piece of ferromagnetic wire capable of nucleating a magnetic domain wall and propagating the wall through the length of the wire in a predetermined direction.

Still a further object of the invention is to provide a magnetic storage medium using a piece of ferromagnetic wire requiring a higher nucleation force than propagation force.

Yet a further object of the invention is to provide a magnetic storage medium consisting of work-hardened ferromagnetic wire such that a greater magnetic force is required to nucleate a magnetic domain wall in the wire than is required to propagate the magnetic domain wall along the length of the wire.

Yet another object of the invention is to provide a magnetic storage medium comprising a piece of work-hardened ferromagnetic wire having one end of lower magnetic reluctance than the other end.

Still a further object of the invention is to provide a magnetic storage medium having a plurality of ferromagnetic wires, each having one end thereof at a lower magnetic reluctnce than the other end.

Another object of the invention is to provide a magnetic storage medium comprising a piece of work-hardened ferromagnetic wire having one end thereof annealed.

Still another object of the invention is to provide a magnetic storage medium comprising a piece of ferromagnetic wire first work-hardened throughout its entirety and then, except for one end thereof, the rest being further work-hardened.

Yet a further object of the invention is to provide a magnetic storage medium wherein the direction of propagation of a magnetic domain wall along the length of the medium is indication of a binary state.

A further object of the invention is to provide a piece of ferromagnetic wire which is work-hardened by twisting the wire whereby the wire requires a greater nucleating force than propagating force.

Still another object of the invention is to provide a piece of ferromagnetic wire requiring a greater nucleating force than propagating force and having the wire spatially offset with respect to a magnetic field.

A further object of the invention is to provide a piece of ferromagnetic wire requiring a greater nucleating force than propagating force and having one end of the wire shortened in accordance with a predetermined code.

A further object is to provide non-destructive ferromagnetic storage medium.

BRIEF DESCRIPTION OF THE INVENTION

Briefly, the invention comprises a magnetic storage medium consisting of a plurality of ferromagnetic wires, work-hardened as, for example, by twisting, so that a larger magnetic force is required for nucleating a magnetic domain wall than is required for propagating the domain wall through the length of the wire. The wire is modified so that the magnetic domain wall will nucleate at one predetermined end thereof. This is done by making one end of each of the wires have a lower reluctance as compared to its opposite end. As a result, the nucleating force for the end of lower reluctance will be less than the nucleating force for the rest of the wire, but greater than the propagating force of the wire. When a magnetic field of sufficient force is placed near the wire, a magnetic domain wall will nucleate at the end of lower reluctance and will propagate along the length of wire to the opposite end. Another method is to cause one end of the wire to reserve more of the magnetic field than the other end. This can be done by shortening one end of the wire or by spatially offsetting in an axial direction the wire with respect to the magnetic field. The direction of propagation will depend on which end will nucleate the magnetic domain wall. Accordingly, a binary value can be stored in each wire determined by the direction of propagation.

In one embodiment, the ferromagnetic wire used is initialized by placing the wire in a first magnetic direction, and then nucleating a magnetic domain wall by using an opposing magnetic force. In an alternate embodiment, a self-nucleating ferromagnetic wire is used of the type described in the above mentioned copending application, having a "soft" core portion and an outer relatively "hard" magnetized shell portion with relatively low and high retentivity, respectively, and a domain wall is nucleated by a force in the same direction as the initializing force.

A better understanding of the invention will be obtained from the following detailed description and the accompanying drawings.

DESCRIPTION OF THE INVENTION

Figure 1:
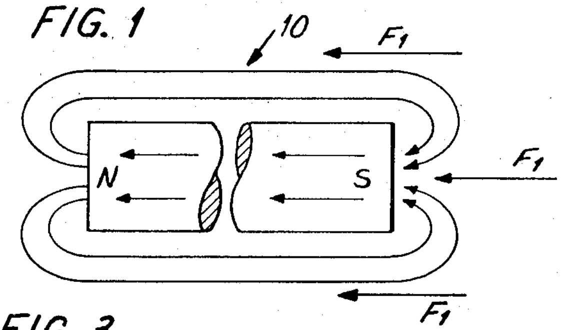
FIG. 1 shows a longitudinal view, partially broken away, of a ferromagnetic wire in accordance with this invention and magnetized in one direction.
Figure 2:
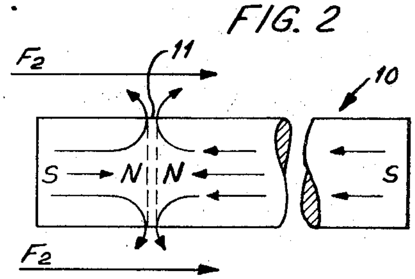
FIG. 2 shows a ferromagnetic wire in accordance with this invention, placed in an opposing magnetic field and nucleating a domain wall.

Referring to FIG. 1, there is shown a piece of ferromagnetic wire generally at 10. The magnetic wire may, for example, have a diameter of 0.012 inches and a length of 0.5 inch. It may be made of a commercially available wire alloy having 48 percent iron and 52 percent nickel and is work-hardened to a condition such that a higher magnetic force is required for nucleation of a magnetic domain wall and a lesser force is required to propagate the nucleated domain wall through the length of the wire. Typically, this is achieved by heating the wire to a first initial temperature to permit hardening of the wire and then rapidly cooling the wire. Alternately, the wire can be twisted forming a helical shape on the outer surface. Such wires typically have a nucleating force requirement of approximately 23 oersteds, and a propagation force requirement of approximately 10 oersteds. The wire has a generally uniform composition and, for example, as shown in FIG. 1, when placed in a magnetic flux F, will be magnetized in a first direction as shown, having its left end a magnetic North and its right end a magnetic South. Flux resulting from the induced magnetism in the wire will pass through the surrounding area flowing from the magnetic North to the magnetic South as is generally known in the art.

When the wire of FIG. 1 is placed in a magnetic field of sufficient force as shown by $F_2$ in a direction opposing the magnetic flux is the ferromagnetic wire 10, a magnetic domain wall 11 is nucleated at one point along the length of the magnetic wire. The nucleated magnetic domain wall propagates along the length of the wire opposing the existing magnetic flux of the wire and inducing a state of magnetization in opposition to the previous state. The nucleation of the magnetic domain wall occurs at one of the ends of the wire; however, it is not possible to predict which end of the wire will nucleate the domain wall.

However, by modifying the wire to reducing the magnetic reluctance of one end of the wire or to effectively increase the magnetic field at one end of the wire, it is possible to predetermine which end of the wire will nucleate the magnetic domain wall. The lower reluctance can be established by annealing one end thereby reducing its magnetic reluctance. Alternately, the opposite end can be additionally work-hardened to increase its reluctance relative to the other end. Effectively increasing the magnetic field can be achieved by initially placing the wire in the magnetic field so that the center of the wire is aligned with the center of the magnetic field. One end of the wire is then shortened so that this end is subject to a stronger magnetic field. By increasing the reluctance of one end as by compressing, the amount of force required for nucleating a pulse at that end is greater than the required nucleation force for the other end but still less than the propagating force required for the total wire. Typically, for the wire previously described having a nucleating force requirement of 23 oersteds and a propagating force requirement of 10 oersteds, annealing one end to a soft state or shortening that end, requires a nucleation force of approximately 16 to 18 oersteds at that end.

Figure 3:
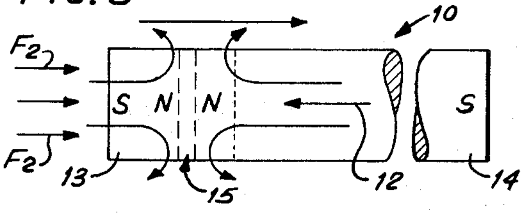
FIG. 3 shows a ferromagnetic wire in accordance with this invention having its left end of less reluctance than the remaining wire and nucleating a pulse at the left end.

Referring to FIG. 3, there is shown the ferromagnetic wire of FIG. 1, which had initially been placed in a magnetic field $F_1$ such that its left end represented a magnetic North and its right end a magnetic South, and having internal magnetic flux as shown by 12. One end 13 of wire 10 has been altered to reduce its reluctance. When placed in an external magnetic field $F_2$, opposing the direction of the existing magnetic flux in wire 10, and of sufficient force to nucleate a domain wall at end 13 but less than that required for nucleating a domain wall at the opposite end 14, a magnetic domain wall 15 will nucleate at the end of lower reluctance 13 and will propagate through the length of the wire 10, to the opposite end 14 as shown by the direction of the travel.

Figure 4:
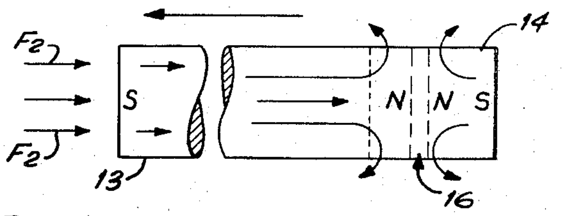
FIG. 4 shows a ferromagnetic wire in accordance with this invention having its right end of less reluctance and nucleating a pulse at the right end.

Referring to FIG. 4, when a similar piece of ferromagnetic wire 10 has its opposite end 14 of reduced reluctance, and similarly having been magnetized in a first direction and subsequently placed in a magnetic field $F_2$ of opposing direction with sufficient force to nucleate a domain wall at the end of reduced reluctance 14, a magnetic domain wall will nucleate at end 14 and will propagate towards end 13 as shown by the direction of travel. Similar effects could have been achieved by shortening one end relative to the other end.

As seen from FIGS. 3 and 4, the direction of travel depends upon which end will nucleate the magnetic wall, which in turn depends upon which end has less reluctance or which end has been shortened. However, the direction of travel is not dependent upon the direction in which the wire had initially been magnetized, nor is it dependent on the direction of the magnetic force in which the wire is placed. As long as the external magnetic force used for nucleation is opposing the existing magnetic state of the wire, a magnetic domain wall will nucleate and propagate down the length of the wire. Since either end of the wire can be selected by reducing the reluctance at that end or shortening that end, it is possible to fix each wire so that it will propagate a domain wall in a given direction. By establishing each of the two directions indicative of a binary value, the wire can be used as a storage element for binary numbers. For example, establishing the direction of travel from left to right as a binary "0," and the direction of travel from right to left as a binary "1," the wire in FIG. 3 would represent a binary "0" and the wire of FIG. 4 would represent a binary "1."

For a piece of wire 0.012 inches diameter and 0.5 inches long, made of a ferromagnetic alloy of 52 percent nickel and 48 percent iron, properly worked into hardness as, for example, by twisting, and having about one-fifth of the wire of lower reluctance than the rest of the wire or about one-fifth of the wire offset so that it is no longer equispaced within the magnetic field, the time required to move a magnetic domain wall from one end to the other, after nucleation of the magnetic domain wall, is approximately 75 microseconds. Generally, about 40 microseconds per 0.5 inch of length is required for 0.006 wire. A faster response is possible by slightly pinching one end of the wire thereby necessitating a higher force to nucleate the domain wall and such larger force will speed the propagation of the nucleated wall to the opposite end.

Figure 5:
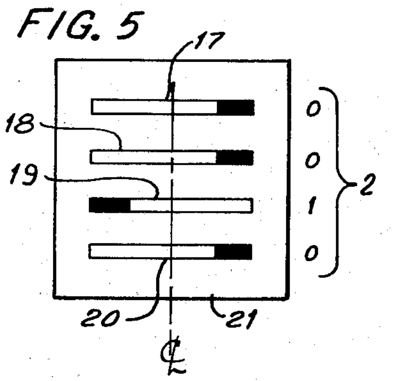
FIGS. 5 and 5A show an application of this invention for storing a binary coded decimal number.
Figure 5A:
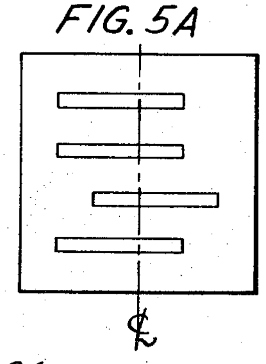

An application of the magnetic storage medium is shown in FIG. 5. Four work-hardened ferromagnetic wires 17, 18, 19, 20 of the type heretofore described are placed on a card 21. Each wire is made of an alloy of 52 percent nickel and 48 percent iron and has a diameter of 0.006 inches and is 0.4 inches long. The wires are spaced 0.001 inches apart from each other. The entire storage medium therefore occupies approximately 0.03 inches by 0.4 inches of area. Wires 17, 18 and 20 have their right ends shortened 0.062 inches of length. Wire 19 has its left end shortened by a similar amount thereby providing the arrangement shown in FIG. 5A. The predetermined code selected is that a direction of travel from right to left represents a binary zero and a direction of travel from left to right represents a binary one.

The card 21 is placed in a first magnetic field which initializes the wires by inducing a magnetic field in all of them in a first direction. The card is then placed in an opposing magnetic field of sufficient force to nucleate a magnetic domain wall at the shortened end. Wires 17, 18 and 20 will nucleate a magnetic domain wall at their right ends and the domain walls will propagate to the left ends. Wire 19 will nucleate a magnetic domain wall at its left end which will travel to its right end. Wires 17, 18 and 20 will generate binary zeros and wire 19 will generate a binary one. In accordance with known binary coded decimal system, the total magnetic storage medium on card 21 will represent the decimal two.

It is understood that the wires on card 21 could be encoded to represent any value up to sixteen. Once the wires have been shortened, they remain a permanent, non-destructive memory storage element. Additional wires could be used to store larger numbers. Instead of shortening, the wire could have its one end annealed to a lower reluctance than the rest of the wire and would produce the same effect.

Figure 6:
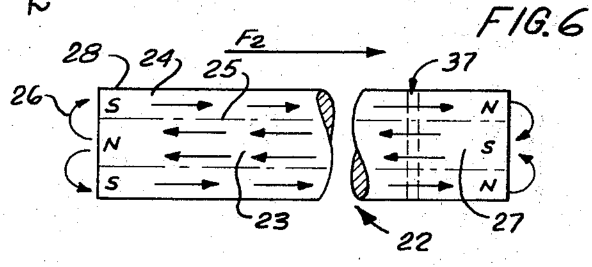
FIG. 6 shows an alternate embodiment of the magnetic storage medium of this invention using a self-nucleating ferromagnetic wire.

Referring to FIG. 6, there is shown an alternate embodiment of a magnetic storage element in conjunction with this invention. Ferromagnetic wire 22 represents a self-nucleating magnetic wire of the type described in the copending U.S. Pat. application No. 86,169, filed Nov. 2, 1970 and in the continuation U.S. Pat. application Ser. No. 137,567, filed Apr. 26, 1971. As described in that application, the self-nucleating ferromagnetic wire has a central core 23 of relatively "soft" magnetic reluctance and an outer shell 24 of relatively "hard" magnetic reluctance. When the self-nucleating ferromagnetic wire is placed in a magnetic field in a first direction, the entire magnetic wire will be uniformly magnetized. When the magnetic field is removed, the outer shell portion will nucleate a magnetic domain wall within the inner core portion thereby reversing the magnetic field in the inner core portion and setting up a domain wall 25 between the outer shell and inner core portions of the wire. When the self-nucleating ferromagnetic wire is again placed in the same magnetic field of force as it was initially, the external magnetic field will nucleate a magnetic domain wall in the inner core portion which will propagate through the core portion resetting it back to the condition wherein the entire ferromagnetic wire is again uniformly magnetized. As explained in the above identified copending application, the end from which the magnetic domain wall will nucleate in the core is indeterminate. However, in accordance with the present invention by making one end of the self-nucleating ferromagnetic wire of lower reluctance than the rest of the wire, or by shortening one end relative to the other end, it is possible to predetermine which end will nucleate the magnetic domain wall and thereby predetermine the direction of propagation of the magnetic domain wall along the length of the wire.

As shown in FIG. 6, a self-nucleating wire 22 was initially placed in a uniform magnetic field of sufficient force to uniformly magnetize the entire wire in a direction such that the left end represents a magnetic South and the right end a magnetic North. When the wire is removed from the external magnetic field, the self-nucleating properties of the ferromagnetic wire will induce a reverse magnetic field, in the central core portion 23 such that the left end represents a magnetic North and right end a magnetic South and the lines of force 26 can pass through the self-nucleating ferromagnetic wire. One end of the magnetic wire 22 is made to have a lower reluctance than the opposite end. Typically, this can be achieved either by annealing end 27, or hard working the opposite end 28. An alternate method of producing the same results would be to shorten one end of the wire relative to the other end so that the wire is not equispaced within the magnetic field, and one end will be more effected by the magnetic field than the other. When the self-nucleating magnetic wire 40 is placed in magnetic field $F_2$ in the same direction as the force which initialized the magnetic field in the wire, and of sufficient magnitude to nucleate a domain wall in the end of reduced reluctance, magnetic domain wall 37 will nucleate at end 27 and will propagate to end 28. When the force $F_2$ is removed, the self-nucleating properties of the wire will set the core 23, to an opposite magnetic state and will be in a ready state for reading out again.

Figure 7:
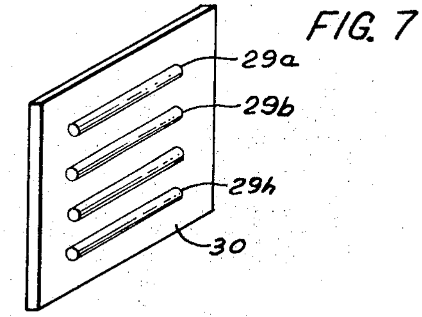
FIG. 7 shows one embodiment of a magnetic memory comprising the ferromagnetic wires in accordance with this invention.

The magnetic wires of the type shown in FIG. 4 or FIG. 6 can be combined to form a large magnetic memory. As shown in FIG. 7, the wires 29*a*, 29*b* . . . 29*n* are placed on a card 30 spaced from each other and in parallel arrangement. The wires are initially work-hardened as, for example, by twisting the wires helically, to obtain the required characteristics. The wires can be encoded while on the card by passing it through a controlled machine which anneals one end of the wires, by a compression machine which slightly compresses one of the ends, or by shortening one end of the wires relative to the other end. As shown, the wires protrude from card 30. Alternatively, the wires could first be encoded and then could be embedded within card 30. Since the magnetic field for readout does not have to come in direct contact with the wire, but merely the force of the field must interact with the wires, the wires could be coated with a nonmagnetic material to protect them and the memory will still operate properly.

Figure 8:
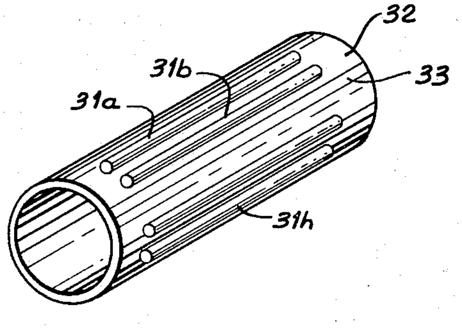
FIG. 8 shows an alternate embodiment of a magnetic memory containing a plurality of ferromagnetic wires in accordance with this invention.

FIG. 8 shows another embodiment of the magnetic storage medium wherein the ferromagnetic wires 31*a* . . . 31*n* are placed on a drum 32. The wires are encoded similarly to those of FIG. 7. A separate strip 33 indicates the beginning of the encoded number and can be magnetized to give an initial start signal.

Figure 9:
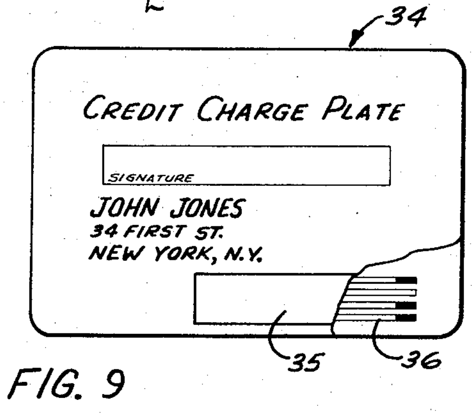
FIG. 9 shows partly cut away view of a credit card using as the storage medium the ferromagnetic wires in accordance with this invention.

Referring to FIG. 9, there is shown one application of the ferromagnetic storage medium to a credit card. Card 34 can be made of thin plastic material having a section 35 covering the ferromagnetic wires 36 embedded therein. The wires are thin enough to fit within the usual thickness of the card. Once the wires are encoded, the covering 35 prevents detection of the particular identification number encoded within the card.

It is also possible to use the ferromagnetic storage medium on security badges for encoded employee identification numbers. Similarly, such wires can be used on paste-on cards which are attached to machines or pieces of equipment for identification. Using a large number of cards as shown in FIG. 7 or a large drum as shown in FIG. 8, it is also possible to form a nondestructive read only memory for a computer system.

As will be apparent to persons skilled in the art, various modifications, adaptions and variations of the foregoing specific disclosure can be made without departing from the teachings of the present invention.

What we claim as new and desire to secure by Letters Patent is:

1. A storage medium comprising at least one ferromagnetic wire of generally uniform composition having a shell portion and a core portion, said shell being magnetically harder than said core portion, said shell portion and said core portion being in sufficiently intimate contact that when said wire is magnetized then flux generated by said shell will in the absence of an overriding external field complete a path through said core and in such state said shell and core will be separated by a domain wall, a first end of said wire being magnetically harder than the second end of said wire.

2. The storage medium of claim 1 including a set of said ferromagnetic wires, said set arranged parallel to one another to provide a set of wire, the ones of said set having their magnetically harder ends at a first side of said set providing a first binary digit and the ones of said set having their magnetically harder ends at the second side of said set providing a second binary digit.

3. The storage medium of claim 1 wherein said harder end is work hardened.

4. The storage medium of claim 2 wherein said harder ends are work hardened.

5. The storage medium of claim 2 further comprising a retention drum for holding said set along a curved surface for rotation about a control axis.

6. The storage medium of claim 2 further comprising retention means for holding said set in a plane.

7. The storage medium of claim 6 wherein said retention means is a flat card.

* * * * *